Oct. 3, 1967  R. W. MALTBY  3,344,667

FLOW MONITOR

Filed Oct. 9, 1964

INVENTOR.
Raymond W. Maltby
BY
Hugh L. Fisher
ATTORNEY

United States Patent Office 3,344,667
Patented Oct. 3, 1967

3,344,667
FLOW MONITOR
Raymond W. Maltby, Brighton, Mich., assignor to General Motors Corporation, Detroit, Mich., a corporation of Delaware
Filed Oct. 9, 1964, Ser. No. 402,738
13 Claims. (Cl. 73—239)

ABSTRACT OF THE DISCLOSURE

A fluid system flow monitor that utilizes an electromagnetically operated piston type flow controller. The flow controller directs fluid to and from a transparent piston and cylinder mechanism so as to reversibly flow-connect the opposite ends of the cylinder and produce reciprocations of the piston. These reciprocations are monitored by light sensitive networks which through trigger and timing circuits cause the electromagnetic operation of the flow controller. Also, a light sensitive network is used to count the piston reciprocations and develop a pulsating output for driving a counter, which provides a visual readout of the quantity of fluid flowing through the system.

---

This invention relates to improvements in flow monitors. The monitor is particularly adapted, although not exclusively, for measuring the amount of fuel consumed by an internal combustion engine.

There are several different methods of checking the different characteristics of flow. These include the use of a pitot tube, a fixed or variable orifice, a venturi, a rotating vane sensor, etc. Each of these methods has disadvantages either because they interfere with the flow, e.g., by introducing friction losses or by otherwise causing the flow to be unnatural, or the range of accurate operation is very limited, e.g., they become unreliable when measuring very slow rates of flow.

Accordingly, new and different apparatus for monitoring flow is proposed for overcoming these problems. The apparatus proposed utilizes a piston-cylinder mechanism that can be easily integrated into a fluid system so as to monitor the fluid being supplied to the system. By a unique arrangement the piston is caused to reciprocate as fluid is transferred from a source to a system at a rate reflecting a characteristic of the flow thereby enabling the monitoring of the piston movement to reflect the characteristic. The piston-cylinder mechanism itself contributes to the unimpeded transfer of the fluid, thus serving a dual function.

The invention also contemplates a novel arrangement in which light sensitive cells are employed both to monitor the piston movements and to control the reciprocations of the piston so that these reciprocations exactly correspond to the characteristic of the flow of fluid to a system being monitored.

Figure 1:
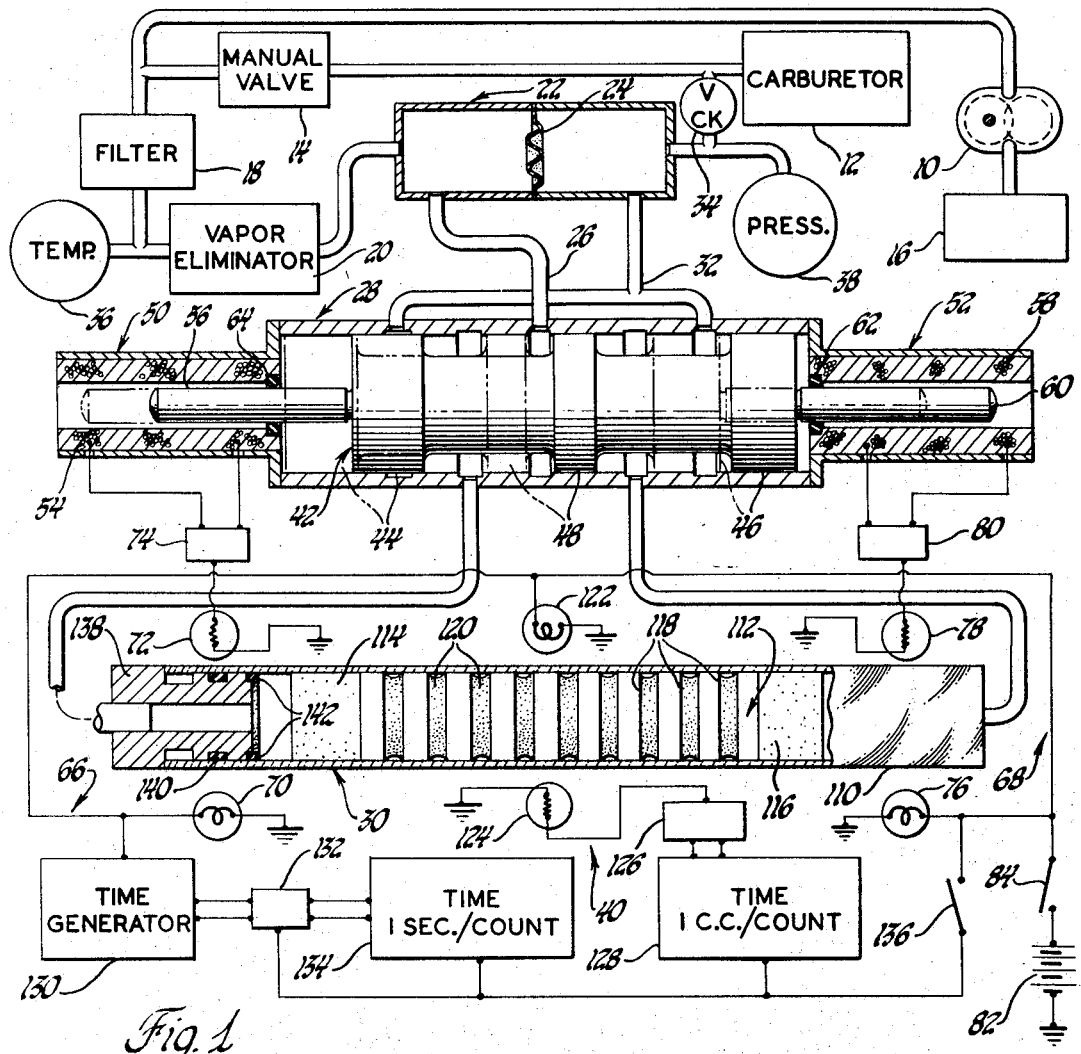
Figure 2:
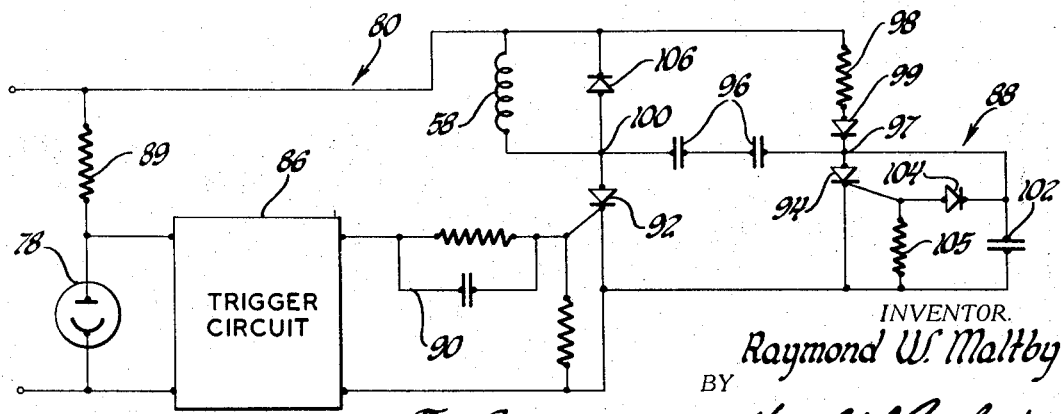

The foregoing and other objects and advantages of the invention will become apparent from the following description and the accompanying drawings, in which:

FIGURE 1 is a schematic diagram of an apparatus incorporating the principles of the invention; and FIGURE 2 is a diagram of a circuit employed by the apparatus.

Considering now the drawings in detail and initially FIGURE 1, the apparatus illustrated is adapted for measuring the amount of fuel consumed by an internal combustion engine. Hence, the apparatus is interconnected between a fuel pump 10 and a carburetor 12, both of which are conventional. A manual valve 14 enables the apparatus to be shunted, if desired, and is of any suitable construction. The fuel in fluid form in a tank 16 is pumped successively through a filter 18 and a vapor eliminator 20 to the inlet side of a chamber 22. The chamber 22 is separated by a flexible diaphragm 24, the purpose of which will be explained later. From the chamber 22 the fluid proceeds via an inlet 26 to a fluid controller 28, the function of which is to direct fluid to and from a piston and cylinder mechanism 30 in such a way as to produce reciprocations thereof. The fluid directed from the piston and cylinder mechanism 30 by the fluid controller 28 proceeds through an outlet 32 to the outlet side of the chamber 22 and to the carburetor 12. A check valve 34 of known construction is installed as shown between the chamber 22 and the carburetor 12. For test purposes a suitable thermometer 36 may be installed between the filter 18 and the vapor eliminator 20 to check the temperature of the incoming fluid, and a pressure gauge 38 can be positioned near the outlet 32 to check the pressure of the fluid supplied to the carburetor 12. In a way to be described the reciprocations of the piston and cylinder mechanism 30 are checked by a monitor, denoted generally at 40, so that the flow between the pump 10 and the carburetor 12 can be accurately measured. It should be appreciated that the apparatus can be used to check the flow characteristics of any fluid and is not restricted to fuel measurement.

In the FIGURE 1 embodiment the flow controller 28 utilizes a two-position pilot valve 42 having end lands 44 and 46 and an intermediate land 48. The maneuvering of the pilot valve 42 to the two illustrated positions is accomplished by electromagnets 50 and 52 arranged at the opposite ends thereof. The electromagnet 50 includes a solenoid winding 54 and an armature 56 either attached to the end of the pilot valve 42 or made integral therewith. The electromagnet 52 has a similar solenoid winding 58 and an armature 60. Appropriate seals at 62 and 64 prevent the fluid from passing to the electromagnets. As will be subsequently discussed, the energization of the solenoid winding 58 will cause the pilot valve 42 due to the repulsion from the resultant magnetic field to assume the broken line position while the energization of the electromagnet 50 will generate a magnetic field that will urge the pilot valve 42 to the solid line position.

The electromagnets 50 and 52 are respectively energized by light sensitive networks designated generally by the numerals 66 and 68. The light sensitive network 66 includes a lamp 70 and a photocell 72 arranged on opposite sides of and proximate the end of the piston and cylinder mechanism 30. The output of the photocell 72 is connected through an energizing circuit 74 to the solenoid winding 54. The light sensitive network 68 is similar to the light sensitive network 66 and includes a lamp 76 and a photocell 78 positioned at the other end of the piston and cylinder mechanism 30. An energizing circuit 80 is interconnected between the output of the photocell 78 and the solenoid winding 58. The power for operating the lamps 66 and 76 and the photocells 72 and 78 is derived from a suitable source, such as a vehicle battery 82. The supply of this battery power is controlled by a switch 84.

Each of the energizing circuits 74 and 80 are identical; hence, only the energizing circuit 80 will be described in detail. This circuit 80 is displayed in FIGURE 2 and, as shown, comprises, in addition to the photocell 78, a trigger circuit 86, which is bistable and may be of the well known Schmitt trigger type, and a timing circuit denoted generally at 88. The photocell 78 is connected in series with a resistor 89, both of which are connected across a voltage source, in this instance the battery 82, so as to effect a voltage division. In a way well known the photocell 78 will develop an output pulse if light rays are removed therefrom. This output pulse will operate the trigger circuit 86 and cause a corresponding pulse with a sharp leading edge to be produced and transferred through an RC coupling 90 to the input of the timing circuit 88.

The timing circuit 88 includes two silicon controlled rectifiers 92 and 94 having their anodes joined through a pair of capacitors shown at 96. The capacitors 96 are arranged so as to eliminate polarity influence and, therefore, in effect operate as one. The cathodes of the controlled rectifiers 92 and 94 are each connected to ground. The incoming pulse from the trigger circuit 86 is applied to the gate electrode of the silicon controlled rectifier 92 and thus will turn it on so that current, assuming conventional current flow, will proceed through the solenoid winding 58 and the controlled rectifier 92 to ground. Prior to conduction by the controlled rectifier 92, the controlled rectifier 94 is conductive so that if it is assumed that the usual vehicle battery voltage of twelve volts is available, approximately a one volt drop will occur across the controlled rectifier 94. Consequently, the anode end of the controlled rectifier 94 (point 97) will be at a voltage of approximately one volt, assuming approximately eleven volts are dropped across a resistor 98 and a diode 99. The voltage at the anode end of the controlled rectifier 92 (point 100) prior to conduction by the controlled rectifier 92 will be twelve volts. When the controlled rectifier 92 starts to conduct the voltage at point 100 will reduce to approximately one volt, assuming again a one volt drop across the controlled rectifier 92 and also an eleven volt drop across the solenoid winding 58. In effect, therefore, the silicon controlled rectifier 94 is biased off. This occurs because the current flow through the controlled rectifier 94 is diverted at point 97 to charge the capacitors 96. This reduces the current level through the controlled rectifier 94 below the holding current level and, therefore, it will shut off.

With the controlled rectifier 94 off, the voltage at point 97 commences to increase and, accordingly, the voltage across a capacitor 102 until approximately ten volts. Prior to this, the capacitor 102 would have a potential of one volt thereacross during the time when the controlled rectifier 94 was conductive. At this ten volts a zener diode 104 connected to the gate of the controlled rectifier 94 will break down and current will flow therethrough to ground by way of a resistor 105. This current will turn the controlled rectifier 94 on. The time interval required to turn on the controlled rectifier 94 can be whatever is desired. With the controlled rectifier 94 again conducting, the voltage at point 97 will reduce and this reduction will cause the current flow through the controlled rectifier 92 to be diverted at point 100 to charge the capacitors 96 until below the holding level for the controlled rectifier 92, at which time it will shut off.

The inclusion of a diode 106 is to facilitate the release of energy from the solenoid winding 58; whereas the diode 99 prevents pulsations in the timing circuit from being fed back into the system.

The piston and cylinder mechanism 30 comprises a cylinder 110 formed of a transparent material, e.g., glass, and a specially constructed piston 112. The piston 112 is formed as a hollow glass tube with the ends sealed so as to have a specific gravity substantially the same as the fluid being monitored. Opaque rings, as the end rings 114 and 116, intermediate counting rings 118 are formed of any suitable material on the periphery of the piston 112. The number of these intermediate counting rings 118 can be whatever is desired, but for purposes of demonstration will be assumed to be ten. To facilitate free reciprocating movement of the piston 112 each of the rings 118 are grooved as shown at 120 to entrap any leakage fluid. These grooves 120 have sharp edges that encourage turbulence of any leakage fluid. This turbulence not only facilitates movement in whatever direction the piston 112 is moving but also produces a very effective seal. Thus the piston 112 is freely movable and there is no communication between the opposite ends of the cylinder around the periphery of the piston 112. The end rings 114 and 116 serve to operate, respectively, the light sensitive circuits 66 and 68, intercepting the light rays and thus cause the corresponding electromagnet 50 or 52 to be energized in the foregoing described way. The counting rings 118 are utilized to operate the monitor 40. Of course, the apparatus without the monitor 40 can have utility for observing different characteristics of fluid; e.g., contamination.

The monitor 40 includes a lamp 122 and a photocell 124 arranged opposite each other at the middle of the cylinder 110 so that as the counting rings 118 intercept the light rays therebetween, pulses are developed that may be increased to a higher level by a driving circuit 126, and then applied to a counter 128. Although a conventional amplifier can be used for a driver, the FIGURE 2 energizing circuit is preferred but with a shorter time delay. Therefore, the counter 128 is always turned off after the elapse of this shorter time interval. Otherwise, the counter 128 could remain on for varying times during normal operation, or even continuously if the piston 112 was stopped with one of the counting rings 118 in a light intercepting position relative to the lamp 122 and the photocell 124. This timed turn-off allows the engine to be stopped at will without concern that counting will continue. Also, this feature permits the trigger pulse to be developed only by the leading edges of the counting rings 118 and is not affected by the trailing edges of the counting rings 118. To use the FIGURE 2 circuit to drive the counter 128 requires only that the solenoid winding 58 be replaced by the energizing coil (not shown) of the counter 128. The counter 128 may be any conventional commercially available kind, such as an IVO counter, that is capable of counting each of the pulses. By proper calibration of the cylinder 110 and the piston 112 each pulse will correspond to a certain amount of fluid. These pulses, therefore, have a frequency that reflects the increments of piston movement, which in turn reflect a certain volume of fluid. For instance, eight pulses per second indicate that eight counting rings 118 have passed the photocell 124 in a one second interval. If the spacing between the leading edges of the counting rings 118 is equivalent to 1 cc. of fluid, 8 cc. of fluid will have been displaced by the piston 112.

Considering now a cycle of operation of the apparatus and commencing with the pilot valve 42 in its solid line position, fluid from the pump 10 is delivered via the inlet 26 between the valve lands 44 and 48 to the left end of the piston 112 as displayed in FIGURE 1. This fluid will move the piston 112 rightwardly and displace the fluid from the right end of the cylinder 110 between lands 46 and 48 of the pilot valve 42 through the outlet 32 and to the carburetor 12. As the end opaque ring 116 intercepts the light beams from the lamp 76 to the photocell 78, the light sensitive network 68 will become effective and develop a trigger pulse for the energizing circuit 80.

Referring now to FIGURE 2, the trigger pulse will be shaped by the trigger circuit 86 and cause the silicon controlled rectifier 92 to turn on so that current is transferred through the solenoid winding 58 of the electromagnet 52. The silicon controlled rectifier 94, of course, turns off for the time interval required for the capacitor 102 to charge to the zener breakdown voltage. The energization of the electromagnet 52 will move the pilot valve 42 to the left and its broken line position so that now fluid from the pump 10 and delivered to the pilot valve 42 by way of the inlet 26 is transferred between the lands 46 and 48 to the right end of the cylinder 110, thus forcing the piston 112 to the left. When the pilot valve 42 is stationary in its broken line position, the electromagnet 52 is deenergized since it has completed its function. Consequently, the capacitor 102 will have reached the zener diode breakdown voltage during this selected time interval and the silicon controlled rectifier 94 will be turned on. Conduction by the silicon controlled rectifier 94 causes the silicon controlled rectifier 92 to be turned off and, therefore, the solenoid winding 58 deenergized. As the piston 112 proceeds to the left the fluid in the left end of the cylinder 110 is displaced through the outlet 32 by way of the lands 44 and 48.

When the opaque end ring 114 intercepts the light rays from the lamp 70 to the photocell 72, the light sensitive circuit 66 becomes effective in exactly the same way as the light sensitive circuit 68 and the solenoid winding 54 is energized, causing the pilot valve 42 to now be returned to its solid line position. A reversal of the fluid flow occurs with the fluid proceeding from the inlet 26 between the valve lands 44 and 48 to the left end of the cylinder 110, thus urging the piston 112 to the right again. The same time delay is provided by the light sensitive circuit 66 prior to deenergizing the solenoid winding 54. These reciprocations continue as long as the fluid is supplied by the fuel pump 10 to the carburetor 12.

As can be appreciated, with the careful calibration of the sizes of the cylinder 110 and the piston 112 so as to have a certain displacement, the movements of the piston 112 between the lamp 122 and the photocell 124 will produce pulses each representing one increment of movement, which corresponds to an exact amount of fuel, in this embodiment 1 cc. is transferred for each pulse and, hence, the counter 128 so calibrated to read directly the quantity of fuel used.

If desired, the time of the test can be also checked by utilizing a suitable time-generator 130, which through an amplifier 132 drives a time elapsed counter 134. The time-generator 130 can be adjusted, e.g., to provide a count each tenth of a second. The time-generator 130 can be rendered operative by connecting it to the battery 82 through a switch 136.

The diaphragm 24 in the tank 22 serves a function that now can be explained. In a normal fuel supply system for an internal combustion engine there are pressure fluctuations to which the carburetor 12 is subjected. This diaphragm 24 having the same fluid on each side will continue to transfer the fluctuations to the carburetor 12 so that while the apparatus is effective the test does not alter normal operating conditions. In other words, the test is not carried out under unnatural conditions. Also, the diaphragm 24 prevents these fluctuations from being transferred to the cylinder 110. Otherwise, these fluctuations can cause the piston 112 to oscillate and produce a false count. Thus, the chamber 22 and the diaphragm 24 cooperate to transfer the fluctuations in the normal manner to the carburetor 12 while simultaneously transferring them to both ends of the piston and cylinder mechanism 30, thus cancelling each other.

Another feature of the piston and cylinder mechanism 30 is the mode of sealing the ends of the cylinder 110 while permitting the travel of the piston 112 to be accurately adjusted. As illustrated at the left end of the cylinder 110, an adapter 138 is installed to the desired depth, which may or may not be with the adapter 138 against the end of the cylinder 110. The adapter 138 has two sealing rings 140 and 142. The sealing ring 140 provides the main seal between the cylinder 110 and the adapter 138, while the sealing ring 142 serves both as a stop for the piston 112 as well as a seal between the piston 112 and the adapter 138 thereby preventing any leakage.

The various values used in the preceding description are for explanatory purposes only. Also, the use of term "fluid" is intended to comprehend either a gas or a liquid.

The invention is to be limited only by the following claims.

What is claimed is:

1. Flow measuring apparatus comprising, in combination, an inlet and an outlet communicating respectively with the source of fluid and a fluid system; a cylinder having a piston slidable therein; the cylinder and the piston together having a predetermined displacement; means controlling the flow of fluid to and from the cylinder so as to cause the fluid to be transferred relatively unimpeded between the inlet and the outlet; the flow controlling means including valve means operative to reversibly flow-connect the opposite ends of the cylinder to the inlet and the outlet so that each end of the cylinder is alternately connected to the inlet and the outlet thereby causing the piston to be reciprocated at a rate corresponding to the flow of fluid transferred from the inlet to the outlet, electromagnetic means for operating the valve means, and means actuated by the piston when moved to each of the end positions thereof for causing the electromagnetic means to be energized; the latter means including means operative to develop an output when the piston moves within the proximity thereof, trigger means operative in response to the output to cause the electromagnetic means to be energized and time delay means operative to cause the electromagnetic means to be deenergized after a certain time delay; and means monitoring the rate of movement of the piston so as to enable the quantity of the fluid transferred to the system to be measured.

2. Flow measuring apparatus comprising, in combination, an inlet and an outlet communicating respectively with a source of fluid and a fluid system; a cylinder having a piston slidable therein; the cylinder and the piston together having a predetermined displacement; means controlling the flow of fluid to and from the cylinder so as to cause the fluid to be continuously transferred relatively unimpeded between the inlet to the outlet; the flow controlling means including valve means operative to reversibly flow-connect the opposite ends of the cylinder to the inlet and the outlet so that each end of the cylinder is alternately connected to the inlet and the outlet thereby causing the piston to be reciprocated at a rate corresponding to the flow of fluid being transferred from the inlet to the outlet, electromagnetic means for operating the valve means, and light sensitive means operated by the piston when moved to each of the end positions thereof for causing the electromagnetic means to be energized; the latter means including means operative to develop an output when the piston moves within the proximity thereof, trigger means operative in response to the output to cause the electromagnetic means to be energized and time delay means operative to cause the electromagnetic means to be deenergized after a certain time interval; and means monitoring the reciprocations of the pistons so as to enable a characteristic of the fluid flow to the system to be measured.

3. Flow measuring apparatus comprising, in combination, an inlet and an outlet communicating respectively with a source of fluid and a fluid system; a cylinder having a piston slidable therein so constructed as to have specific gravity substantially the same as the fluid; the cylinder and the piston together having a predetermined displacement; means controlling the flow of fluid to and from the cylinder; the flow controlling means including valve means operative to reversibly flow-connect the opposite ends of the cylinder to the inlet and the outlet so that each end of the cylinder is alternately connected to the inlet and the outlet thereby causing the piston to be reciprocated at a rate corresponding to the flow of the fluid transferred from the inlet to the outlet, electromagnetic means for operating the valve means, and means actuated by the piston when moved to each of the end positions thereof for causing the electromagnetic means to be energized; the latter means including means operative to develop an output when the piston moves within the proximity thereof, trigger means operative in response to the output to cause the electromagnetic means to be energized and time delay means operative to cause the electromagnetic means to be deenergized after a certain time interval; and means monitoring the reciprocations of the piston so as to enable the quantity of the fluid flow to the system to be measured.

4. Flow measuring apparatus comprising, in combination, an inlet and an outlet communicating respectively with a source of fluid and a fluid system; a transparent cylinder having a piston slidable therein; the piston having a specific gravity substantially the same as the fluid and having light intercepting surfaces at each end thereof; means controlling the flow of fluid to and from the cylinder so as to cause the fluid to be transferred between the inlet and the outlet; the flow controlling means including a valve maneuverable to a plurality of positions and operative to reversibly flow-connect the opposite ends of the cylinder to the inlet and the outlet so that each end of the cylinder is alternately connected to the inlet and the outlet as the valve is maneuvered to the plurality of positions thereby causing the piston to be reciprocated at a rate corresponding to the quantity of fluid transferred from the inlet to the outlet, a pair of electromagnets each operative when energized to maneuver the valve to one of the plurality of positions, and light sensitive means responsive to the movements of the piston for controlling the operation of the electromagnets, the light sensitive means including a light source directing light rays through the cylinder into the path of movement of the piston and a pair of light sensitive cells each located proximate an end of the cylinder so as to receive the light rays from the source and develop an output when the piston intercepts the light rays thereto, and means interconnecting each light sensitive cell with one of the electromagnets, the interconnecting means including trigger means operative in response to the output from the light sensitive cells to cause the associated electromagnet to be energized and timing means for deenergizing the electromagnet after a certain time interval adequate to permit the valve to reverse directions; and means monitoring the reciprocations of the piston so as to enable the quantity of the fluid transferred to the system to be measured.

5. Flow measuring apparatus comprising, in combination, an inlet and an outlet communicating respectively with a source of fluid and a fluid system; a transparent cylinder having a piston slidable therein; the piston having a specific gravity substantially the same as the fluid and having light intercepting surfaces at each end thereof; means controlling the flow of fluid to and from the cylinder so as to cause the fluid to be transferred between the inlet and the outlet; the flow controlling means including a valve maneuverable to a plurality of positions and operative to reversibly flow-connect the opposite ends of the cylinder to the inlet and the outlet so that each end of the cylinder is alternately connected to the inlet and the outlet as the valve is maneuvered to the plurality of positions thereby causing the piston to be reciprocated at a rate corresponding to the quantity of fluid transferred from the inlet to the outlet, a pair of electromagnets each operative when energized to maneuver the valve to one of the plurality of positions, and light sensitive means responsive to the movements of the piston for controlling the operation of the electromagnets, the light sensitive means including a light source directing light rays through the cylinder into the path of movement of the piston, a pair of light sensitive cells each located proximate an end of the cylinder so as to receive the light rays from the source and develop an output when the piston intercepts the light rays thereto, an energizing network interconnecting each light sensitive cell with one of the electromagnets, each energizing network including a trigger circuit for causing the associated electromagnet to be energized in response to the output from the light sensitive cell and a timing circuit for deenergizing the electromagnet after a certain time interval adequate to permit the valve to reverse directions; and means monitoring the reciprocations of the piston so as to enable the quantity of the fluid transferred to the system to be measured.

6. Flow measuring apparatus comprising, in combination, an inlet and an outlet communicating respectively with the source of fluid and a fluid system; a cylinder of transparent material having a piston slidable therein; the piston being so constructed as to have substantially the same specific gravity as the fluid and having light intercepting surfaces at each end thereof; the cylinder and the piston together having a predetermined displacement; means controlling the flow of fluid to and from the cylinder so as to cause the fluid to be transferred between the inlet and the outlet, the cylinder having adapters at each end thereof for adjustably establishing piston travel and for sealing the ends of the cylinder and also for effecting a seal between the ends of the adapter and the piston; the flow controlling means including a valve maneuverable to a plurality of positions and operative to reversibly flow-connect the opposite ends of the cylinder to the inlet and the outlet so that each end of the cylinder is alternately connected to the inlet and the outlet as the valve is maneuvered to the plurality of positions thereby causing the piston to be reciprocated at a rate corresponding to the quantity of fluid being transferred from the inlet to the outlet, a pair electromagnets each operative when energized to maneuver the valve to one of the plurality of positions, and light sensitive means responsive to the movements of the piston for controlling the operation of the electromagnets, the light sensitive means including a light source directing light rays through the cylinder and into the path of movement of the piston and a pair of light sensitive cells each located proximate an end of the cylinder so as to receive the light rays from the source and develop an output when the piston intercepts the light rays thereto, an energizing network interconnecting each light sensitive cell with one of the electromagnets, each energizing network including a trigger circuit for causing the associated electromagnet to be energized in response to the output from the light sensitive cell and a timing circuit for deenergizing the electromagnet after a certain time interval adequate to permit the valve to reverse directions; and means monitoring movements of the piston; the monitoring means including counting means calibrated to provide a visual indication of the characteristic being measured, and means driving the counter means in response to the incremental movements of the piston.

7. Flow measuring apparatus comprising, in combination, an inlet and an outlet communicating respectively with a source of fluid and a fluid system; a cylinder of transparent material having a piston slidable therein; the piston having end light interceptor surfaces and a series of spaced apart light interceptor surfaces between the end light interceptor surfaces, the piston having a specific gravity corresponding to that of the fluid; the cylinder and the piston together having a predetermined displacement; means controlling the flow of fluid to and from the cylinder so as to cause fluid to be transferred between the inlet and the outlet; the flow controlling means including a valve maneuverable to a plurality of positions and operative to reversibly flow-connect the opposite ends of the cylinder to the inlet and the outlet so that each end of the cylinder is alternately connected to the inlet and the outlet as the valve is maneuvered to the plurality of positions thereby causing the piston to be reciprocated at a rate corresponding to the quantity of fluid being transferred from the inlet and the outlet, a pair of electromagnets each operative when energized to cause the valve to be maneuvered to one of the plurality of positions, and light sensitive means responsive to the movements of the piston for controlling the operation of the electromagnets, the light sensitive means including a light source directing light rays through the cylinder and into the path of movement of the piston and a pair of light sensitive cells each located proximate an end of the cylinder so as to receive the light rays from the source and each light sensitive cell having an operative connection with one of the electromagnets so as to cause the associated electromagnet to be energized when the end light interceptor surface alters the light rays thereto; and means monitoring movements of the piston, the monitoring means including counting means calibrated to provide a visual indication of the quantity of fluid being measured and means driving the counter means in response to certain incremental movements of the piston, the driving means including another light sensitive cell operatively connected to the counting means and so positioned relative to the cylinder and the light source as to develop a pulsating output as the series of spaced light intercepting surfaces alter the light rays transferred thereto during the reciprocations of the piston, the pulsating output having a frequency corresponding to the certain increments of piston movement.

8. Flow measuring apparatus comprising, in combination, an inlet and an outlet communicating respectively with a source of fluid and a fluid system, a cylinder having a transparent portion and also a piston slidable therein, the piston having a series of spaced light intercepting surfaces between the ends thereof adjacent the transparent portion of the cylinder, the cylinder and the piston together having a predetermined displacement, flow control means reversibly flow-connecting the opposite ends of the cylinder to the inlet and the outlet so that each end of the cylinder is alternately connected to the inlet and the outlet thereby causing the piston to be reciprocated at a rate corresponding to the characteristic being measured of fluid transferred from the inlet to the outlet, and means monitoring incremental movements of the piston, the monitoring means including counting means calibrated to provide a visual indication of the characteristic being measured and means driving the counter means in response to incremental movements of the piston, the driving means including a light source directing light rays through the transparent portion of the cylinder and into the path of movement of the piston and a light sensitive cell operatively connected to the counting means and so positioned relative to the cylinder and the light source as to develop a pulsating output as the light intercepting surfaces alter the light rays transferred thereto during reciprocations of the piston, the pulsating output having a frequency corresponding to the incremental piston movements.

9. Flow measuring apparatus comprising, in combination, an inlet and an outlet communicating respectively with a source of fluid and a fluid system; a cylinder having a transparent portion and also a piston slidable therein, the piston having a series of spaced light intercepting surfaces thereon; the cylinder and the piston together having a predetermined displacement; means controlling the flow of fluid to and from the cylinder so as to cause fluid to be transferred between the inlet and the outlet, the flow controlling means including valve means operative to reversibly connect the opposite ends of the cylinder to the inlet and the outlet so that each end of the cylinder is alternately connected to the inlet and the outlet thereby causing the piston to be reciprocated at a rate corresponding to the quantity of fluid being transferred from the inlet to the outlet and means actuated by the piston when moved to each end position thereof for operating the valve means, and means monitoring the movements of the piston, the monitoring means including counting means calibrated to provide a visual indication of the characteristic being measured and means driving the counter means in response to the incremental movements of the piston, the driving means including a light source directing light rays through the transparent portion of the cylinder and into the path of movement of the piston, a light sensitive cell operatively connected to the counting means and so positioned relative to the cylinder and the light source as to develop a pulsating output as the light intercepting surfaces alter the light rays transferred thereto during reciprocations of the piston, the pulsating output having a frequency corresponding to the incremental piston movements, and means causing the pulsating output to be developed only by the leading edges of the intercepting surfaces.

10. Flow measuring apparatus comprising, in combination, an inlet and an outlet communicating respectively with a source of fluid and a fluid system, a transparent cylinder having a piston slidable therein, the piston being so constructed as to have a specific gravity corresponding to the specific gravity of the fluid and having a series of equispaced light intercepting surfaces thereon, means controlling the flow of fluid to and from the cylinder so as to cause fluid to be transferred between the inlet and the outlet, the flow controlling means including valve means operative to reversibly flow-connect the opposite ends of the fluid cylinder to the inlet and the outlet so that each end of the cylinder is alternately connected to the inlet and the outlet thereby causing the piston to be reciprocated at a rate corresponding to the quantity of fluid being transfered from the inlet to the outlet, electromagnetic means for operating the valve means, and means responsive to the movements of the piston for energizing the electromagnetic means, and means monitoring the movements of the piston, the monitoring means including counting means calibrated to provide a visual indication of the qauntity of fluid measured, and means driving the counter means in response to incremental movements of the piston, the driving means including a light source directing light rays through the cylinder and into the path of movement of the piston and a light sensitive cell operatively connected to the counting means and so positioned relative to the cylinder and the light source as to develop a pulsating output as the light intercepting surfaces alter the light rays transferred thereto during reciprocations of the piston, the pulsating output having a frequency corresponding to the incremental piston move ments.

11. In a flow monitor, the combination of an inlet and an outlet communicating respectively with a source of fluid and a fluid system; a cylinder having a piston slidable therein; means controlling the flow of fluid to and from the cylinder so as to cause the fluid to be transferred between the inlet and the outlet; the flow controlling means including valve means operative to reversibly flow-connect the opposite ends of the cylinder to the inlet and the outlet so that each end of the cylinder is alternately connected to the inlet and the outlet thereby causing the piston to be reciprocated and fluid transferred between the inlet and the outlet, electromagnetic means for operating the valve means, and means responsive to the movements of the piston for controlling the operation of the electromagnetic means, the latter means including a pair of switching devices each located proximate an end of the cylinder and so arranged as to be actuated by the piston and develop an output when the piston is within the proximity thereof, an energizing network interconnecting each switching device with the electromagnetic means, each energizing network including a trigger circuit for causing the electromagnetic means to be energized in response to the output from the switching device and a timing circuit for deenergizing the electromagnetic means after a certain time interval adequate to permit the piston to reverse directions.

12. In a flow monitor, the combination of an inlet and an outlet communicating respectively with a source of fluid and a fluid system; a cylinder having a piston slidable therein; the piston having a specific gravity substantially the same as the fluid; means controlling the flow of fluid to and from the cylinder so as to cause the fluid to be transferred between the inlet and the outlet; the flow controlling means including a valve maneuverable to a plurality of positions and operative to reversibly flow-connect the opposite ends of the cylinder to the inlet and the outlet so that each end of the cylinder is alternately connected to the inlet and the outlet as the valve is maneuvered to the plurality of positions thereby causing the piston to be reciprocated and fluid transferred from the inlet to the outlet, a pair of electromagnets each operative when energized to maneuver the valve to one of the plurality of positions, and means responsive to the movements of the piston for controlling the operation of the electromagnets, the latter means including a pair of switching devices each located proximate an end of the cylinder and so arranged as to be actuated by the piston and develop an output when the piston is within the proximity thereof, an energizing network interconnecting each switching device with one of the electromagnets, each energizing network including a trigger circuit for causing the associated electromagnet to be energized in response to the output from the switching device and a timing circuit for deenergizing the electromagnet after a certain time interval adequate to permit the piston to reverse directions.

13. In a flow monitor, the combination of an inlet and an outlet communicating respectively with source of fluid and a fluid system; a transparent cylinder having a piston slidable therein; the piston having a specific gravity substantially the same as the fluid and having light intercepting surfaces at each end thereof; and means controlling the flow of fluid to and from the cylinder so as to cause the fluid to be transferred between the inlet and the outlet; the flow controlling means including a valve maneuverable to a plurality of positions and operative to reversibly flow-connect the opposite ends of the cylinder to the inlet and the outlet so that each end of the cylinder is alternately connected to the inlet and the outlet as the valve is maneuvered to the plurality of positions thereby causing the piston to be reciprocated and fluid transferred from the inlet to the outlet, a pair of electromagnets each operative when energized to maneuver the valve to one of the plurality of positions, and light sensitive means responsive to the movements of the piston for controlling the operation of the electromagnets, the light sensitive means including a light source directing light rays through the cylinder into the path of movement of the piston, a pair of light sensitive cells each located proximate an end of the cylinder so as to receive the light rays from the source and develop an output when the piston intercepts the light rays thereto, an energizing network interconnecting each light sensitive cell with one of the electromagnets, each energizing network including a trigger circuit for causing the associated electromagnet to be energized in response to the output from the light sensitive cell and a timing circuit for deenergizing the electromagnet after a certain time interval adequate to permit the piston to reverse directions.

References Cited
UNITED STATES PATENTS

| | | | |
|---|---|---|---|
| 1,799,875 | 4/1931 | Thompson | 73—239 X |
| 2,014,664 | 9/1935 | Nicholls | 73—250 |
| 2,948,890 | 8/1960 | Barth et al. | 88—14 X |
| 2,970,546 | 2/1961 | White | 91—459 X |
| 3,118,069 | 1/1964 | Guillant | 88—14 X |

FOREIGN PATENTS

| | | |
|---|---|---|
| 212,584 | 5/1960 | Austria. |
| 412,368 | 6/1934 | Great Britain. |
| 593,871 | 10/1947 | Great Britain. |

JAMES J. GILL, *Acting Primary Examiner.*

RICHARD C. QUIESSER, *Examiner.*

E. D. GILHOOLY, *Assistant Examiner.*